United States Patent
Tachnoff (10) Patent No.: US 11,552,912 B2
(45) Date of Patent: Jan. 10, 2023

(54) PROCESS FOR OPTIMIZING THE STORAGE SPACE ON A MESSAGING SERVER AND ASSOCIATED SYSTEM

(71) Applicant: ATOS INTEGRATION, Bezons (FR)

(72) Inventor: Serge Tachnoff, Paris (FR)

(73) Assignee: BULL SAS, Les Clayes-sous-Bois (FR)

( * ) Notice: Subject to any disclaimer, the term of this patent is extended or adjusted under 35 U.S.C. 154(b) by 0 days.

(21) Appl. No.: 17/467,755

(22) Filed: Sep. 7, 2021

(65) Prior Publication Data

US 2022/0078144 A1    Mar. 10, 2022

(30) Foreign Application Priority Data

Sep. 8, 2020 (EP) .................................. 20305992

(51) Int. Cl.
*H04L 51/046* (2022.01)
*G06F 3/06* (2006.01)
*H04L 51/216* (2022.01)

(52) U.S. Cl.
CPC .......... *H04L 51/046* (2013.01); *G06F 3/0608* (2013.01); *G06F 3/0652* (2013.01); *G06F 3/0673* (2013.01); *H04L 51/216* (2022.05)

(58) Field of Classification Search
CPC ... H04L 51/046; H04L 51/216; G06F 3/0608; G06F 3/0652; G06F 3/0673; G06F 16/9577; G06Q 10/107
See application file for complete search history.

(56) References Cited

U.S. PATENT DOCUMENTS

| 11,086,823 B2* | 8/2021 | Chung | G06F 16/1748 |
|---|---|---|---|
| 2005/0165948 A1* | 7/2005 | Hatime | H04L 47/12 |
| | | | 709/234 |
| 2007/0244974 A1* | 10/2007 | Chasin | G06Q 10/107 |
| | | | 709/206 |
| 2012/0323862 A1* | 12/2012 | Mandel | G06F 16/2255 |
| | | | 707/E17.005 |
| 2015/0229721 A1* | 8/2015 | Kluin | G06F 16/9024 |
| | | | 709/201 |
| 2015/0269183 A1* | 9/2015 | Avati | G06F 16/1865 |
| | | | 707/634 |

(Continued)

FOREIGN PATENT DOCUMENTS

| EP | 3336786 A | 6/2018 |
|---|---|---|
| WO | 2008000532 A1 | 1/2008 |

OTHER PUBLICATIONS

European Search Report dated Mar. 1, 2021, in EP20305992.8, 9 pages.

(Continued)

*Primary Examiner* — Michael A Keller
*Assistant Examiner* — Thao D Duong
(74) *Attorney, Agent, or Firm* — Arc IP Law, PC; Joseph J. Mayo (57) ABSTRACT

A process for optimizing storage space of a messaging server that stores electronic messages. Sets of messages may be processed to identify redundant elements, such as common text clauses or attachments, that appear in multiple messages. These redundant elements may be stored and removed from the associated messages. When a message is read, the removed elements may be replaced in the message at their original positions to reconstruct the original message.

10 Claims, 5 Drawing Sheets

(56) References Cited

U.S. PATENT DOCUMENTS

2017/0221084 A1* 8/2017 Thirugnanasundaram .................. G06Q 10/107
2019/0266170 A1* 8/2019 Hazel ...................... G06F 16/13

OTHER PUBLICATIONS

Smarter Email System: Removal of Redundant Attachments in Received and Reply Emails ED—Darl Kuhn, IP.com, IP.com Inc., West Henrietta, NY, US, May 7, 2014 (6 pages).

* cited by examiner

From: Microsoft Outlook
Sent on: Tuesday, June 30, 2020, 21:10
To: USER
Subject: Your mail box is nearly full.
Importance: High

Your mail box is nearly full.

4915 Mb

Reduce the size of your mail box by deleting superfluous elements from it and by emptying the trash folder.

FIG. 7

PROCESS FOR OPTIMIZING THE STORAGE SPACE ON A MESSAGING SERVER AND ASSOCIATED SYSTEM

BACKGROUND OF THE INVENTION

Field of the Invention

At least one embodiment of the invention relates to electronic messaging servers and in particular processes making it possible to optimize the storage space on electronic messaging servers.

Description of the Related Art

An electronic messaging server will eventually reach memory saturation of its storage space storing all the electronic messages or e-mails in a user's electronic messaging box. It is then essential to reduce the storage space used in order to be able to store new electronic messages.

Figure 7:
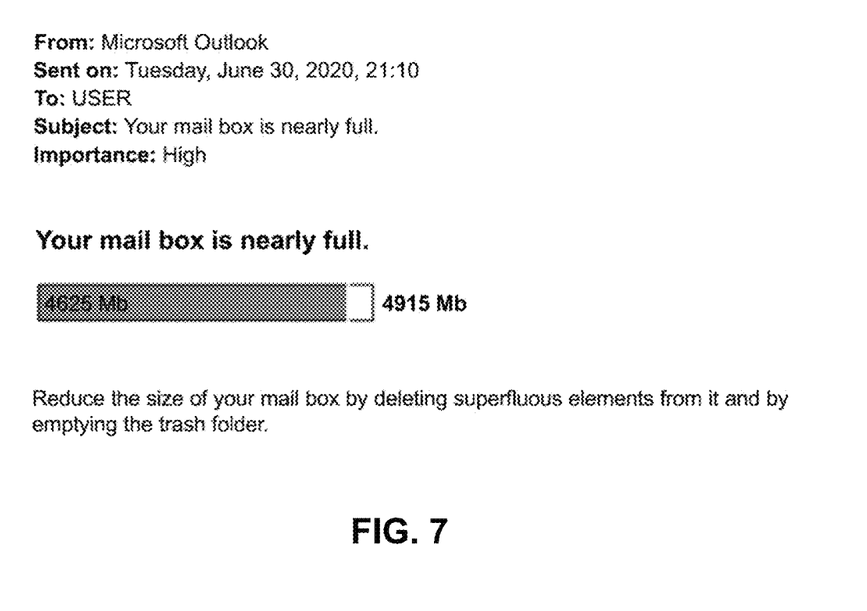
FIG. 7 is an example of a notification to a user that message storage space needs to be reduced.

Notifications, for example the notification shown in FIG. 7, can then be sent to the user, in order to invite them to delete superfluous elements from their electronic messaging box.

However, it may be difficult to identify superfluous elements and/or the number of superfluous elements deleted may be insufficient to satisfactorily reduce the storage space used.

In order to overcome saturation of the storage space, it is known to make use of instant messaging in order to limit the number of e-mails exchanged. However, these solutions are not systematically employed, in particular in the event that the number of exchanges with a given recipient is limited, which is the case for external exchanges for which e-mails are preferred. These solutions therefore only delay the point at which saturation is reached.

There are also solutions for optimizing the storage space of a server, using for example data compression. However, applying this solution to a messaging server will alter the user experience, since the user would no longer be able to readily read a message which has been compressed to carry out a search on a group of compressed messages.

There is therefore a need to optimize the storage space of a messaging server without altering the user's experience when they read their messages.

BRIEF SUMMARY OF THE INVENTION

To this end, the invention relates to a process for optimizing the storage space of a messaging server on which a set of electronic messages is stored, the storage space having a filling level, each electronic message being associated with a message identifier, the process comprising:
  a step of identifying at least one redundant element having a plurality of occurrences within at least one subset of electronic messages of the set of electronic messages, each occurrence being associated with the message identifier corresponding to the electronic message wherein the occurrence is located and with a position identifier corresponding to the position of the occurrence in the electronic message;
  a step of storing each identified redundant element and of associating an element identifier with each stored redundant element;
  for each stored redundant element:
    a step of associating the corresponding element identifier with the position identifier and with the message identifier associated with each occurrence of the corresponding plurality of occurrences;
    a step of deleting the corresponding plurality of occurrences in each electronic message of the subset of electronic messages in order to obtain a deconstructed electronic message for each electronic message of the subset of electronic messages;
  on receipt of a request to read an electronic message from the subset of electronic messages:
    a step of determining each element identifier associated with the message identifier corresponding to the electronic message;
    a step of adding each redundant element associated with a determined element identifier at the position corresponding to the associated position identifier in the corresponding deconstructed electronic message, in order to obtain a reconstructed electronic message.

By virtue of the process, the deconstructed electronic messages are freed of redundant elements, reducing the filling level of the storage space, which causes lower consumption of the operating resources.

The process makes it possible to reconstruct the deconstructed electronic messages in a manner identical to the originals, not altering the user experience when they read the messages.

In addition to the features mentioned in the preceding paragraph, the process may have one or more complementary features from the following, taken individually or according to all technically plausible combinations:
  the process is triggered when the filling level reaches a triggering threshold;
  the process is triggered by the user;
  the process is triggered when a new electronic message is received;
  the execution of the steps of identifying, storing, associating and deleting is stopped when the filling level is less than or equal to a cut-off threshold;
  the subset of electronic messages is chosen such that the filling level is less than or equal to a cut-off threshold at the end of the process;
  during the storage step, only a limited number of redundant elements is stored;
  the process comprises a step of selecting a subset of redundant elements, the subset being selected from the identified redundant elements, in order for the filling level to be less than or equal to a cut-off threshold at the end of the process;
  each electronic message is associated with a memory size and the identification step is carried out in decreasing memory size order;
  each electronic message has a size greater than a limit size;
  each electronic message is selected within a discussion thread;
  each redundant element is a signature, a clause, an environmental message, an anti-virus message or an attached document.

The invention further relates to a system for implementing the process according to the invention, characterized in that it comprises a messaging server configured to store a set of electronic messages.

Aside from the features which have just been mentioned in the preceding paragraph, the system may have the following complementary feature:

the system further comprises a computation module configured to store each redundant element and each identifier and/or to reconstruct an electronic message on request from the user.

The invention also relates to a computer program product comprising instructions that, when the program is executed on a computer, lead the latter to implement the steps of the process according to the invention.

The invention and its different applications will be better understood after reading the following disclosure and examining the accompanying figures.

BRIEF DESCRIPTION OF THE FIGURES

The figures are presented by way of reference and are in no way limiting to the invention.

DETAILED DESCRIPTION

A process 100 for optimizing the storage space 4 of a messaging server 3 and a system 1 configured to implement said process 100 are presented with reference to FIGS. 1 to 6.

Figure 3:
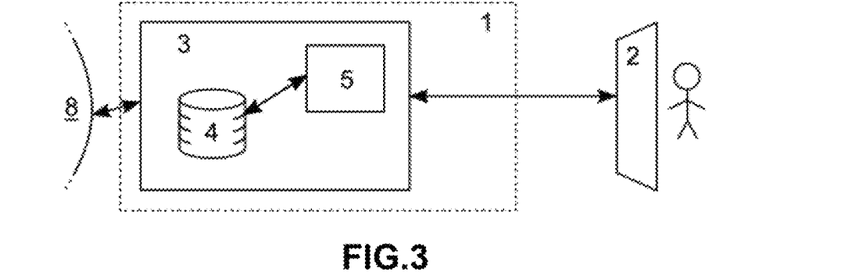
FIG. 3 is a schematic view of a first embodiment of a system according to the invention.

FIG. 3 presents a first embodiment of the system 1 configured to implement the process 100. The system 1 comprises the messaging server 3. The messaging server 3 is the interface between a messaging client 2 and a network 8. The network 8 may be a local network or the Internet. The network 8 may for example implement a mail transfer protocol such as SMTP (Simple Mail Transfer Protocol). The messaging server 3 is configured to store a set of electronic messages 10. To this end, it comprises a storage space 4. The electronic messages 10 are received by the messaging server 3 and stored on the storage space 4. The storage space 4 has a filling level dependent on the number and size of the stored electronic messages 10.

According to the first embodiment, the messaging server 3 also comprises a processor 5 making it possible to perform operations on the electronic messages 10 stored on the storage space 4, for example in order to modify the content thereof or to delete an electronic message 10.

Usually, the user of the messaging server 3, or recipient, reads the stored electronic messages 10 via the messaging client 2. They can thus, by virtue of the messaging client 2, read, modify or delete the stored electronic messages 10.

Each electronic message 10 stored on the storage space 4 is associated with a message identifier 41.

An electronic message 10 may be of text type. It comprises at least one body, preferentially a header, and can also comprise one or more attached documents.

The header comprises for example information enabling the electronic message 10 to be conveyed to the recipient. An example of a header may be as follows:

Received: from domainexp.com
by mta.domainexp.com with HTTPS via
secure.domainexp.com; Tue, 21 Sep. 2020 12:49:18+0000
Received: by domaindest.com id 1A2B3C4D5E6F; Tue, 21 Sep. 2020 12:49:16+0000
Content-Type: application/ms-tnef; name="winmail.dat"
Content-Transfer-Encoding: binary
From: Jean
To: François
Subject: Hello!
Thread-Topic: Hello!
Message-ID:
Content-Language: fr-FR
MIME-Version: 1.0

The header comprises several fields making it possible for example to identify the sender and the recipient by virtue of their messaging addresses, the subject of the message or else the time of sending. The header fields may also comprise information regarding the type of encoding used (linked to the language used), making it possible to correctly decode the body of the electronic message. The header fields may be partially masked from the recipient of the electronic message.

The body of the electronic message comprises for example text such as information to be communicated to the recipient. An example of an electronic message body is as follows:

Hello François,
To make a bread baguette you need flour, water, yeast and salt. Make a dough from the ingredients and bake the dough. For a light crumb, knead the dough preferably for 15 min. Fora crunchy baguette, bake the dough preferably at 250° C. for 20 min. Take a look at the kneading machine and oven references in the attachments.
Jean
Artisan baker
1 place de l'epi
Blés-sur-Champ
For environmental reasons, only print this email out if you need to.
    From: "François"
    To: jean@domainexp.com
    Subject: Recipe for bread baguette
    Date: Tue, 22 Sep. 2012 09:27:13+0200
    Hello Jean,
    I want to make some bread baguettes but I don't have the recipe. Could you help me out? And would you also be able to give me a few references for the necessary equipment?
    Thanks in advance,
    François Aside from the information transmitted by the electronic message 10 (for example the bread baguette recipe), the body of the electronic message 10 may also comprise elements which can be added automatically before sending the electronic message, such as a signature, a clause, a warning message or an environmental message. The sender's signature comprises for example a postal address or telephone numbers. The clauses or warning/environmental messages may for example be reminders of confidentiality rules or about environmentally friendly behavior.

The electronic message 10 may also comprise one or more attached documents, such as text files, images, binary files or compressed files.

When an electronic message 10 is part of a discussion thread, it may also comprise at least part of a previous electronic message 10, from which it follows on. The part of the previous electronic message 10 comprises for example some fields extracted from the header of the previous electronic message 10, and also all or part of the body of the previous electronic message 10. In the above example, the recipient (François) receives a response to a question which he sent in a first electronic message 10 to a sender (Jean). The storage space 4 of the recipient's messaging server 3 therefore comprises the electronic message 10 previously sent to the sender, largely repeated in the electronic message 10 received by the recipient. Therefore, on the storage space 4, there are at least two occurrences 20 of a plurality of redundant elements 30.

The redundant elements 30 comprise in this case header fields and the whole body of the first electronic message 10. The number of redundant elements 30 and the number of associated occurrences 20 will probably increase based on the exchanges within the same discussion thread between the recipient and the sender.

If the recipient has already received electronic messages 10 from the sender, then the storage space 4 may also comprise several electronic messages 10 comprising the sender's signature or the reminder about environmentally friendly behavior.

The size of the electronic message 10 is defined as the storage space required to store said electronic message 10. The more elements contained in the body of the electronic message 10, such as signatures, clauses, parts of previous electronic messages 10 from which it follows on, the larger the size of said electronic message. Likewise, the more attached documents contained in the electronic message 10, the larger the size of said electronic message. This results in a higher filling level of the storage space 4.

The process 100 makes it possible to optimize the storage space 4 of the messaging server 3. Optimizing the storage space is intended to mean reducing the filling level of the storage space 4.

Figure 1:
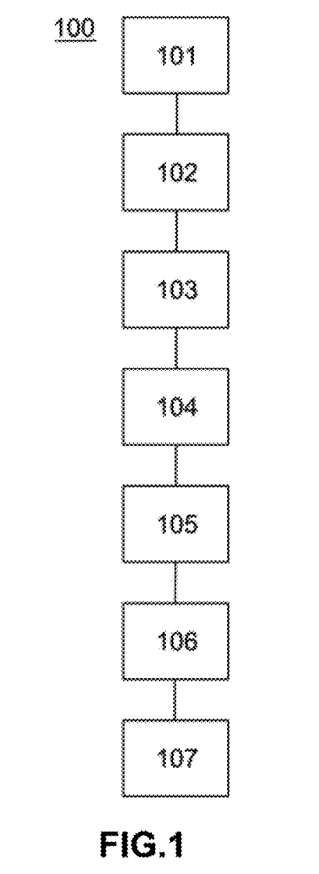
FIG. 1 is a schematic view of a first embodiment of a process according to the invention.
Figure 2:
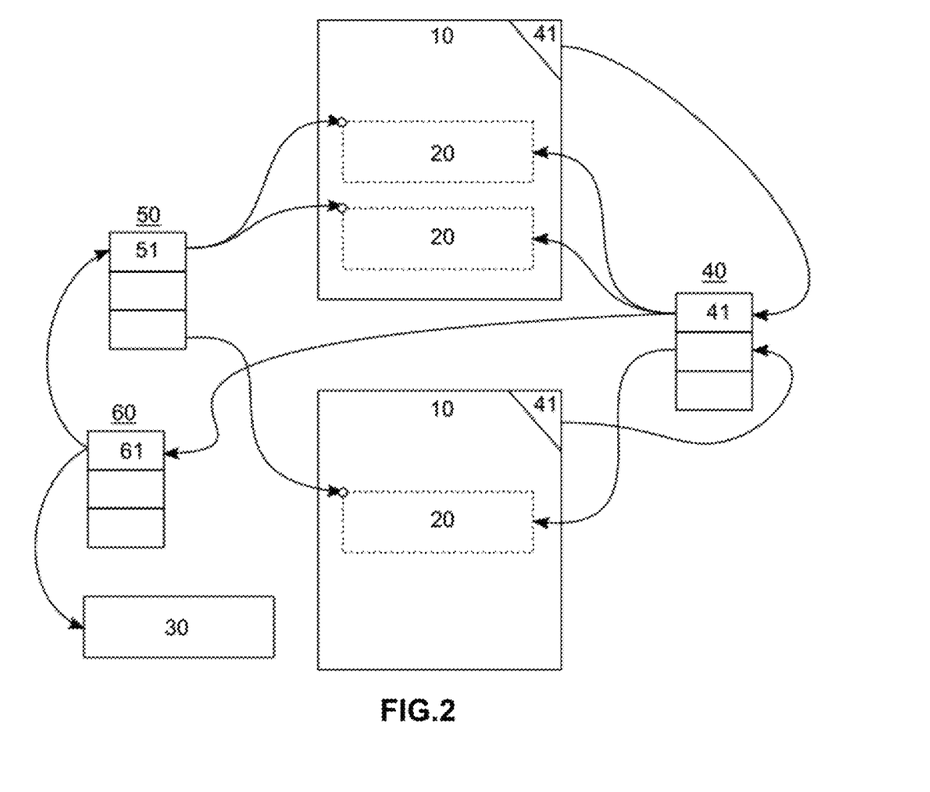
FIG. 2 is a schematic view of a set of electronic messages processed by the process according to the invention.

The optimization process 100 according to the invention is firstly described with reference to FIGS. 1 and 2. The process 100 comprises a step of identifying 101 at least one redundant element 30 having a plurality of occurrences 20 within at least one subset of electronic messages 10 of the set of electronic messages 10 stored on the storage space 4. The identification step 101 also makes it possible to determine the position of each occurrence 20 within each message 10 of the subset of electronic messages 10.

The identification 101 may be carried out by comparing a subset of electronic messages 10 in order to determine portions of messages which are shared between the messages, forming the occurrences 20 of the redundant elements 30. Advantageously, the identification 101 implements an algorithm making it possible to detect the longest shared portions of messages. In this way, the process 100 makes it possible to greatly reduce the filling level of the storage space 4. The identification 101 not based on syntactic elements also makes it possible to compare portions of electronic messages 10 in which the elements do not follow a usual format. For example, the body of an electronic message 10 may be formatted by means of a non-standard markup language. The identification 101 not based on syntactic elements also makes it possible to determine the position of each occurrence within the subset of electronic messages 10.

According to one embodiment of the process 100, the identification 101 may be carried out by virtue of syntactic analysis of all the electronic messages 10 and a comparison of the elements resulting from the syntactic analysis.

Syntactic analysis makes it possible to search for key words such as "from", "to", "cc", "subject", and makes it possible to determine the position of header fields in each electronic message 10. A header field may be part of the body of the electronic message 10. The header fields are then compared in pairs within the subset of electronic messages 10 comprising header fields, in order to identify the redundant header fields 30, i.e. those comprising at least two occurrences. The list of key words above is not exhaustive and is provided by way of illustrative example. The key words may comprise other key words or the translation of the fields into different languages.

The search for key words such as "street", "dead end", "tel", "fax", "mobile", "web", or their equivalents in one or more languages, makes it possible to determine the position of a signature in each electronic message 10. A comparison between the signatures of each electronic message 10 of the subset of electronic messages 10 comprising at least one signature makes it possible to identify the redundant signatures.

The search for key words such as "warning", "disclaimer", "message", "virus", "planet", "environment", "confidential", or their equivalents in one or more languages, makes it possible to determine the position of a warning message and/or of an environmental message. The warning/environmental messages are then compared in pairs within the subset of electronic messages 10 comprising said warning/environmental messages, in order to identify the redundant warning/environmental messages 30.

The identification 101 may also comprise searching for redundant elements 30 among the attached documents, also referred to as attachments or attached files, attached to the electronic messages 10. The identification 101 may comprise the comparison of attached documents with one another or the comparison of metadata associated with the documents. For example, when the documents are text files, the contents of said documents can be compared directly. Whether the attached documents are binary or text-based, they can be compared from their message digest. The message digest of a document can be obtained by hashing, for example by means of the MD5 algorithm (Message Digest 5). The attached documents may also be compared based on their metadata, such as the names of each file, the creation/modification dates or the sizes.

The redundant element(s) 30 resulting from the identification step 101 may also comprise elements such as:
 a shared message portion;
 a header field;
 a signature;
 a warning/environmental message;
 an attached document;
 an anti-virus software message.

The list of redundant elements 30 presented here is not exhaustive and may comprise other types of elements.

The attached documents may have a size very much larger than the other types of redundant elements 30. Thus, the multiple occurrences 20 of a document stored on the messaging server 3 may cause a high filling level of the storage space 4. Thus, in order to effectively reduce the rate of use of the storage space 4, it may be advantageous to favor searching for redundant elements 30 among the attached documents.

Nonetheless, the documents may have lower redundancy than the textual elements, such as the header fields or signatures. Even with a small size, the multiple occurrences 20 of a textual element stored on the messaging server 3 may also cause a high filling level of the storage space 4. In order to effectively reduce the rate of use of the storage space 4, it may be advantageous to favor searching for redundant elements 30 among the textual elements, i.e. within the headers or bodies of the electronic messages 10.

During the identification 101, it may be advantageous to select a particular type of elements, such as textual elements or attached documents. In this way, only one type of redundant elements 30 is processed, making it possible to reduce the duration of execution of the process 100. Selecting one or the other of the types of elements nonetheless makes it possible to obtain a satisfactory reduction in the occupancy level.

The identification step 101 also comprises associating each occurrence 20 of a redundant element 30 with the message identifier 41 within which the occurrence 20 is located. In the embodiment of FIG. 2, said association is stored in an occurrence table 40. The occurrence table 40 may be an associative array.

Each occurrence 20 is also associated with a position identifier 51. The position identifier 51 refers back to the position of the occurrence 20 within the electronic message 10. In the embodiment of FIG. 2, said association is stored in a position table 50. The position table 50 may also be an associative array.

The process 100 comprises a step of storing 102 each identified redundant element 30 in order to be able to relocate them when reading an electronic message 10. The storage step 102 also comprises associating an element identifier 61 with each stored redundant element 30. In the embodiment of FIG. 2, the element identifiers 61 are stored in an element table 60. The element table 60 may also be an associative array.

The redundant elements 30 may be stored on the messaging server 3, as presented by the embodiment of FIG. 3. According to this embodiment, the redundant elements 30 are stored on the storage space 4 of the messaging server 3. According to this same embodiment, the occurrence table 40, the position table 50 and the element table 60 are also stored on the messaging server 3, for example on the storage space 4.

Figure 4:
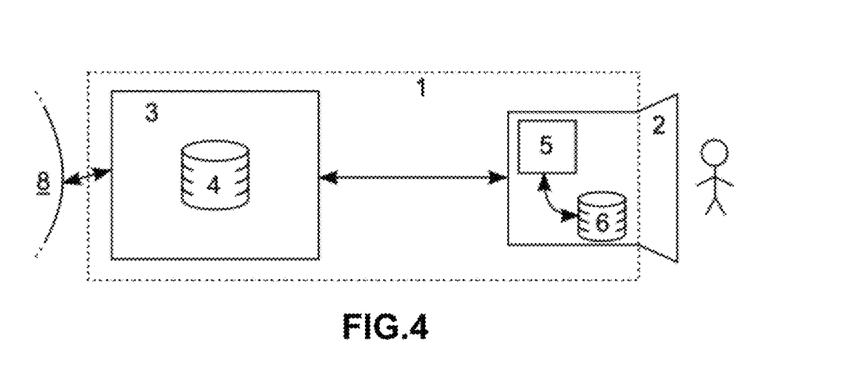
FIG. 4 is a schematic view of a second embodiment of the system according to the invention.
Figure 5:
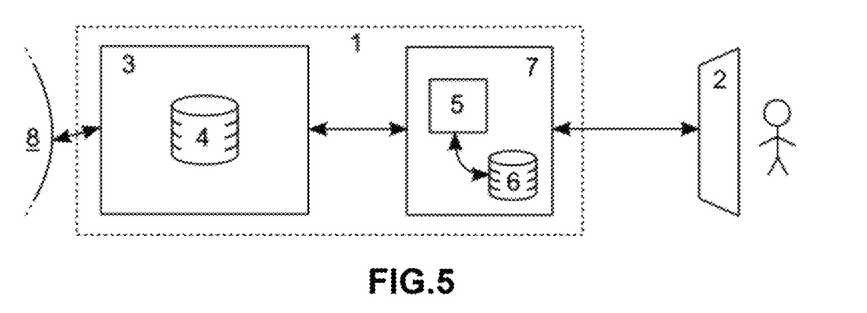
FIG. 5 is a schematic view of a third embodiment of the system according to the invention.

According to the embodiment of FIGS. 4 and 5, the redundant elements 30 and/or the occurrence table 40, the position table 50 and the element table 60 may be stored on a second storage space 6 of the system 1. This second storage space 6 is preferentially separate from the messaging server 3. These embodiments afford the advantage of not requiring modifications to the messaging server 3 in order to implement the process 100. The second storage space 6 may be included in the messaging client 2 or on a computation module 7.

The steps of the process 100 may be implemented by means of the processor 5. The latter 5 may be included at the messaging client 2 or at the computation module 7 as presented in FIGS. 4 and 5. In this way, the messaging server 3 does not need to be modified in order to implement the process 100. According to the embodiment of FIG. 5, neither the messaging server 3 nor the messaging client 2 need to be modified in order to implement the process. It is sufficient to interface the computation module 7 between the messaging server 3 and the messaging client 2 in order to have elements making it possible to implement the process 100.

The process 100 comprises a step of associating 103 and a step of deleting 104 each occurrence 20. The process 100 thus makes it possible to deconstruct each electronic message 10 from the subset of electronic messages 10. Deconstructed electronic message 10 is intended to mean an electronic message 10 free of all of the occurrences 20 of the stored redundant elements 30.

During the association step 103, each element identifier 61 is associated with the position identifier 51 of each occurrence 20 of the redundant element 30 to which it relates. Each element identifier 61 is also associated with each message identifier 41 within which said occurrence 20 is located. In other words, when at least one occurrence 20 of at least one redundant element 30 is located in an electronic message 10, the message identifier 41 refers back to each element identifier 61, each element identifier 61 in turn referring back to each position identifier 51 of the associated occurrence 20.

During the deletion step 104, each occurrence 20 of each redundant element 30 is deleted from the subset of electronic messages 10. This thus gives the subset of deconstructed electronic messages 10.

Each deconstructed electronic message 10, freed of one or more occurrences 20 of redundant elements 30, has a smaller size than the corresponding original electronic message 10. Thus, the filling level of the subset of deconstructed electronic messages 10, stored on the storage space 4, is lower than the filling level of the subset of corresponding original electronic messages 10.

Since the redundant elements 30 are stored within the system 1, there is no information loss.

According to the embodiment of the system 1, presented in FIG. 3, the redundant elements 30 are stored on the messaging server 3. On the other hand, a single occurrence of each redundant element 30 is stored on the messaging server 3. The filling level of the storage space 4 is therefore reduced.

According to the embodiments of the system 1 presented in FIGS. 4 and 5, the redundant elements 30 are stored outside the messaging server 3, further reducing the filling level of the storage space 4 thus freed of all the occurrences 20 of the redundant elements 30.

The set of steps of identifying 101, storing 102, associating 103 and deleting 104 will also be referred to as the deconstruction step.

The process 100 also makes it possible to reconstruct a deconstructed electronic message 10. The process 100 can be readily transposed to the reconstruction of a plurality of deconstructed electronic messages 10.

A deconstructed electronic message 10 is reconstructed when the user wishes to read the electronic message 10 in its original form. The reconstruction is triggered on receipt 105 of a request to read the electronic message 10. In this way, the reconstruction of the electronic message does not need to be anticipated. The filling level also remains reduced outside of the reading of an electronic message 10.

To this end, the process 100 comprises a determination step 106 and an addition step 107.

By selecting the electronic message 10, the associated message identifier 41 is obtained, for example, by means of the message table 40. During the determination step 106, each element identifier 61 associated with the message identifier 41 is determined. The position at which each redundant element 30 has to be inserted can be obtained by virtue of the association between the element identifier 61 and each position identifier 51.

During the addition step 107, each redundant element 30 associated with a determined element identifier 61 is added to the deconstructed electronic message 10. Thus, the electronic message 10 is reconstructed comprising all the information contained in the original electronic message 10. In this way, the process 100 makes it possible to retain all the information. Nonetheless, in order to reconstruct the electronic message 10 identically to the original, each redundant element 30 is added at the position corresponding to the associated position identifier 51. Thus, the reconstructed electronic message 10 corresponds to the original electronic message 10. The deconstruction and reconstruction are carried out transparently for the user.

According to an alternative to the process 100, making it possible to avoid having to resort to the occurrence table 40 and position table 50, each element identifier 61 may be inserted into the electronic message 10 during the deletion step 104, instead of each occurrence 20 of the element with which it is associated. Thus, the determination step 106 may be carried out by means of syntactic analysis of the electronic message 10. According to this alternative, the addition step 107 then also comprises deleting each element identifier 61 of the electronic message 10 when the redundant element 30 has been added.

The process 100 can be triggered automatically. For example, when the filling level of the storage space 4 reaches a triggering threshold. The triggering threshold may for example be equal to 90%. The triggering threshold may be configurable, i.e. adjustable by the user. The process 100 can also be triggered by the user, in order for them to be able, for example, to force the deconstruction 101, 102, 103, 104 of the electronic messages 10 when they are not using the digital resources of the system 1. In order to minimize use of the digital resources of the system 1, the process 100 can be triggered automatically on receipt of a new electronic message 100.

Advantageously, the deconstruction steps 101, 102, 103, 104 can be carried out in batches and optionally during periods of low activity, such as nighttime or public holidays.

The process 100 can carry out the steps of deconstructing 101, 102, 103, 104 the electronic messages 10 until the filling level reaches a cut-off threshold. The cut-off threshold is preferentially lower than the triggering threshold and may for example be 80%. The cut-off threshold may be configurable. For example, the redundant elements 30 may firstly be searched for among the attached documents, making it possible to identify a subset of electronic messages 10 to be processed. The deconstruction steps 101, 102, 103, 104 thus make it possible to reduce the filling level down to a first level. If the first level is greater than the cut-off threshold, then new redundant elements 30 can be searched for among textual elements such as signatures, making it possible to further expand the subset of electronic messages 10 to be deconstructed. The deconstruction steps 101, 102, 103, 104 thus make it possible to further reduce the filling level until it is less than or equal to the cut-off threshold.

For example, a first identification 101 of redundant elements 30 among the documents made it possible to identify 18 redundant documents. The deconstruction 101, 102, 103, 104 made it possible to reduce the filling level from 90% to 80.4%. A second identification 101 of redundant elements 30 among the textual elements made it possible to identify 20 redundant signatures and 18 redundant warning messages. The deconstruction 101, 102, 103, 104 made it possible to reduce the filling level by 0.4% to reach the threshold level of 80%.

Even reducing the filling level by deleting all the occurrences 20 of the redundant elements 30, the filling level of the storage space 4 can become saturated. When the storage space 4 is saturated (filling level of 100%), it is necessary to delete some of the electronic messages 10 already stored on the messaging server 3 in order to be able to store new messages. In order to delay the time at which electronic messages 10 are deleted, the identification 101 of redundant elements 30 is advantageously carried out taking into account all the types of elements, whether documents or textual elements. Thus, the reduction of the filling level is greatest.

A smaller reduction of the filling level may be sufficient and makes it possible in particular to reduce the execution time of the process 100. To this end, the set of electronic messages 10 within which the identification 101 of redundant elements 30 is carried out may comprise just a part of the set of non-deconstructed electronic messages 10 stored on the messaging server 3, previously referred to as subset of electronic messages 10.

The electronic messages 10 comprise one or more redundant elements 30 which may have a larger size than the electronic messages not comprising a redundant element 30. Thus, the set of electronic messages 10 within which the identification 101 is carried out may preferentially comprise non-deconstructed electronic messages 10, the size of which is greater than a limit size. In this way, the process 100 processes electronic messages 10 having a high likelihood of comprising redundant elements 30, or even large redundant elements 30, such as documents, without processing all the electronic messages 10 stored on the messaging server 3. Thus, the reduction of the filling level is effective, while reducing the execution time of the process 100.

According to an alternative, each electronic message 10 is associated with a size and the identification step 101 is carried out in decreasing size order. Thus, the electronic messages 10 with a large size are processed first, making it possible to rapidly reduce the filling level, while processing all the electronic messages 10.

The electronic messages 10 contained in a discussion thread have a high likelihood of containing redundant elements 30 such as the subject of the discussion thread or a signature of one of the senders. In order to reduce the identification time 101 and the number of electronic messages 10 to be processed, the non-deconstructed electronic messages 10 are preferentially selected within a discussion thread.

Advantageously, during the storage step 102, only a limited number of redundant elements 30 is stored and associated with an element identifier 61. Thus, the stored redundant elements 30 randomly comprise redundant elements 30 having a large size and/or a high level of redundancy. The process 100 reduces the filling level by deleting the occurrences of redundant elements 30 of large size and/or of a high level of redundancy. The limited number has the advantage of reducing the number of redundant elements 30 processed and therefore the duration of execution of the process 100. The limited number may be configurable.

Figure 6:
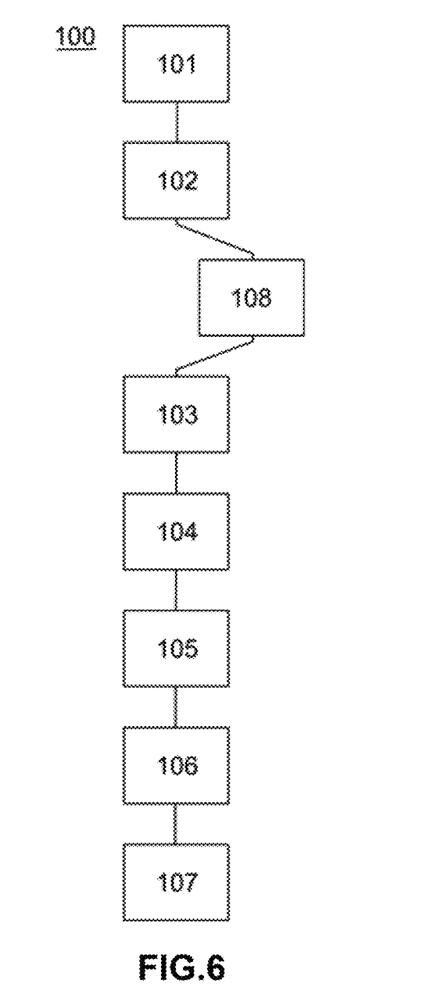
FIG. 6 is a schematic view of a second embodiment of the process according to the invention.

In order to sufficiently reduce the filling level while reducing the execution time of the process 100, an alternative of the process 100, shown in FIG. 6, comprises a step of selecting 108 a subset of redundant elements 30 from the redundant elements 30 identified during the identification step 101. During the selection step 108, all the occurrences 20 of the redundant elements 30 are identified and associated with a size. A plurality of random subsets of redundant elements 30 is formed and an estimate of the reduction of the filling level is calculated for each subset. The subset retained makes it possible to reach the cut-off threshold. Advantageously, the subset retained makes it possible to reach the cut-off threshold while minimizing the number of redundant elements 30 to be processed and therefore the execution time of the process 100.

According to the alternative of FIG. 6, the storage step 102 stores each redundant element 30 of the subset of redundant elements 30 retained during the selection step 108.

For example, the subset of redundant elements 30 resulting from the selection step comprises 1021 redundant signatures, 822 warning messages and 9 attached documents. The deconstruction 101, 102, 103, 104 has made it possible to reduce the filling level from 90% to 80%.

The invention claimed is:

1. A process for optimizing storage space of a messaging server on which a set of electronic messages is stored, the storage space having a filling level, each electronic message of said set of electronic messages being associated with a message identifier, the process comprising:
   identifying at least one redundant element, wherein
      each redundant element of said at least one redundant element has a corresponding plurality of occurrences within at least one subset of electronic messages of the set of electronic messages; and
      each occurrence of the corresponding plurality of occurrences is associated with
         the message identifier corresponding to an electronic message wherein each occurrence is located, and
         a position identifier corresponding to a position of each occurrence in the electronic message;
   storing each redundant element of said at least one redundant element;
   associating an element identifier with each redundant element;
   for each redundant element:
      associating the element identifier with the position identifier and with the message identifier associated with each occurrence of the corresponding plurality of occurrences; and
      deleting the corresponding plurality of occurrences in each electronic message of the at least one subset of electronic messages to obtain a deconstructed electronic message for each electronic message of the at least one subset of electronic messages;
   on receipt of a request to read an electronic message from the at least one subset of electronic messages:
      determining each element identifier associated with the message identifier corresponding to the electronic message;
      adding each redundant element associated with each element identifier at the position corresponding to the position identifier in a corresponding deconstructed electronic message, to obtain a reconstructed electronic message.

2. The process according to claim 1, wherein said process is triggered when the filling level reaches a triggering threshold.

3. The process according to claim 1, wherein said process is triggered by a user.

4. The process according to claim 1, wherein said process is triggered when a new electronic message is received.

5. The process according to claim 1, wherein the at least one subset of electronic messages is chosen such that the filling level is less than or equal to a cut-off threshold after performing said process.

6. The process according to claim 1, wherein
   each electronic message is associated with a memory size; and
   said identifying at least one redundant element is performed in decreasing order of said memory size.

7. The process according to claim 1, wherein each redundant element comprises one or more of a signature, a clause, an environmental message, an anti-virus message, and an attached document.

8. The process according to claim 1, further comprising said messaging server.

9. The process according to claim 8, further comprising a computation module configured to perform one or both of storing each redundant element and the element identifier; reconstructing an electronic message on request from a user.

10. The process according to claim 1, further comprising a computer program comprising instructions that, when the computer program is executed on a computer, executes the process.

* * * * *